United States Patent [19]

Yokoyama

[11] Patent Number: 4,775,126

[45] Date of Patent: * Oct. 4, 1988

[54] SEAT SLIDE DEVICE

[75] Inventor: Shoh Yokoyama, Tokyo, Japan

[73] Assignee: Tachi-S Co., Ltd., Tokyo, Japan

[*] Notice: The portion of the term of this patent subsequent to Jul. 12, 2005 has been disclaimed.

[21] Appl. No.: 927,354

[22] Filed: Nov. 4, 1986

[51] Int. Cl.4 .............................. F16M 13/00
[52] U.S. Cl. .................. 248/430; 248/419; 296/65.1; 297/346; 297/473; 384/34
[58] Field of Search .......... 248/430, 419, 420, 424, 248/425, 429; 384/10, 18, 19, 47, 42, 37, 38, 34; 297/344, 346, 473; 296/65 R, 63

[56] References Cited

U.S. PATENT DOCUMENTS

| | | | |
|---|---|---|---|
| 3,889,913 | 6/1975 | Adams | 248/430 |
| 4,516,811 | 5/1985 | Akiyama et al. | 384/34 |
| 4,556,186 | 12/1985 | Langmessser, Jr. et al. | 384/34 X |
| 4,564,236 | 1/1986 | Kluting et al. | 297/344 |
| 4,629,254 | 12/1986 | Stolper et al. | 248/430 X |

FOREIGN PATENT DOCUMENTS

| | | | |
|---|---|---|---|
| 737270 | 6/1966 | Canada | 248/430 |
| 2702576 | 7/1978 | Fed. Rep. of Germany | 248/430 |
| 2715640 | 10/1978 | Fed. Rep. of Germany | 248/430 |
| 2806795 | 8/1979 | Fed. Rep. of Germany | 248/430 |

*Primary Examiner*—David L. Talbott
*Attorney, Agent, or Firm*—Oldham & Oldham

[57] ABSTRACT

A seat slide device for use in an automotive seat which is mounted on the right and left sides of a seat frame to adjust the position of the automotive seat forwardly and backwardly. The seat slide device comprises a first slide rail and a second slide rail to which an anchor of a seat belt is to be attached. A second upper rail included in the second slide rail has in its lower portion a first slide portion identical with that of a first upper rail in the first slide rail as well as a second slide portion fixed on the opposite side of the first slide portion. That is, the second slide rail is constructed such that its upper rail is engageable with its lower rail at the two positions thereof, with the result that the second upper rail of the second slide rail is able to share a removing load by the seat belt anchor at the first and second slide portions.

5 Claims, 2 Drawing Sheets

SEAT SLIDE DEVICE

BACKGROUND OF THE INVENTION

1. Field of the Invention

The present invention relates to a seat slide device for mounting a seat to the floor surface of an automobile in such a manner that the seat can be adjusted in position forwardly and rearwardly, and, in particular, to a seat slide device comprising a pair of slide rails, that is, an upper rail to be fixed onto the side of the seat and a lower rail to be fixed onto the side of the automotive floor surface.

2. Description of the Prior Art

In a conventional automotive seat with an anchor of a seat belt mounted thereto, because a great load to remove or detach is applied to a slide rail to which the anchor is mounted, the slide rail is formed of a thicker metal plate than that of the opposite slide rail thereof. Also, since there is interposed reinforcement means between the anchor mounting portion of the slide rail and a seat frame and the above-mentioned anchor of the seat belt is positioned in the portion of the reinforcement means which is extended horizontally and outwardly from the upper rail and seat frame, the slide rail to which the anchor is mounted stands at a disadvantageous position dynamically with respect to the input loads of the anchor, with the result that the reinforcement means must be formed of a thicker plate. This results in the increased costs and weights of the conventional slide devices.

Especially, in such conventional seat slide devices as are provided with the lock mechanisms of a reclining device respectively in the right and left portions thereof, there is produced a great difference of input loads between the side thereof to which the anchor is mounted and the other side thereof with no such anchor attached. As a result of this, the above-mentioned disadvantage becomes further greater.

SUMMARY OF THE INVENTION

The present invention aims at eliminating the drawbacks found in the above-mentioned conventional seat slide devices.

Accordingly, it is an object of the invention to provide a seat slide device which is capable of reducing the weight thereof and also of decreasing the costs thereof by employing common parts in both the right and left slide rails thereof.

In accomplishing the above object, according to the invention, there is employed a structure in which an upper rail employed in a second rail to which an anchor of a seat belt is to be mounted is formed by fixing its slide portion to the lower portion of a first upper rail employed in a first slide rail, that is, the second upper rail in the second slide rail on the side of the seat belt anchor is engaged at the two right and left positions thereof with its associated lower rail. Therefore, since the second upper rail is able to share or receive at the two positions thereof a removing load to be given by the seat belt anchor, there is eliminated the need to make the second upper rail thicker than the first upper rail as in the above-mentioned slide device, so that the weight of the present slide device is not increased. Also, because the second upper rail includes a vertically extending mounting portion to which the anchor of the seat belt can be mounted, the second upper rail can take a great height. That is, loads to be applied to the seat belt anchor can be dispersed so that there is obtained a structure which is advantageous in strength. In addition, since the second upper rail in the second slide rail is formed by using the first upper rail of the first slide rail, the manufacturing costs thereof can be reduced.

The above and other objects and features of the invention will appear more fully hereinafter from a consideration of the following description taken in connection with the accompanying drawings wherein one example is illustrated by way of example.

DETAILED DESCRIPTION OF A PREFERRED EMBODIMENT OF THE INVENTION

Detailed description will be given hereinbelow of an embodiment of the invention in connection with the drawings.

Figure 1:
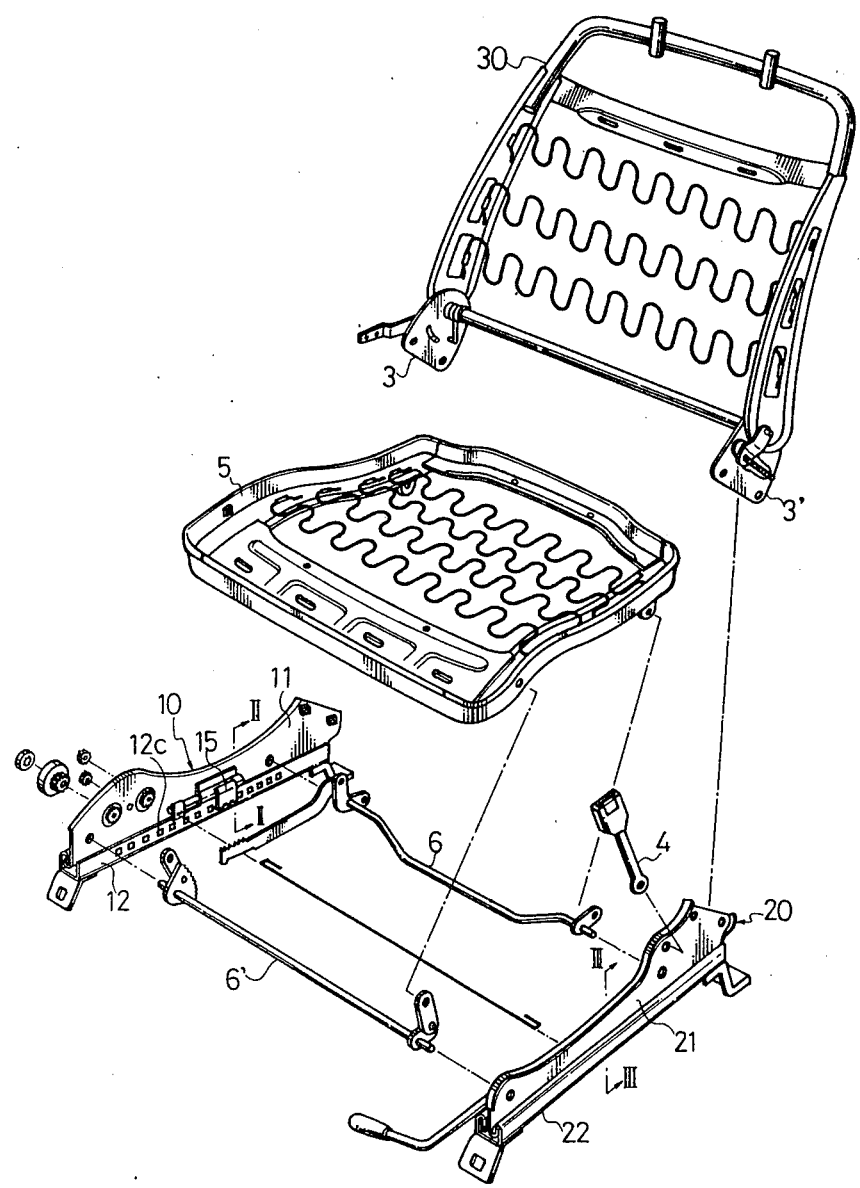
FIG. 1 is a perspective view of a slide device according to the invention, illustrating a state in which a seat frame and a back frame are not yet attached to the slide device.

Referring first to FIG. 1, there is shown a state in which a seat frame (5) and a back frame (30) are to be attached to a seat slide device constructed in accordance with the present invention. In this figure, reference numeral (10) designates a first slide rail which comprises a first upper rail (11) to be mounted onto the side of an automotive seat and a first lower rail (12) which is fixed to the side of the floor of the automobile and into which the first upper rail (11) is slidably inserted.

In the figure, (20) designates a second slide rail which comprises a second upper rail (21) to be mounted onto the side of the automotive seat, and a second lower rail (22) which is fixed to the side of the automotive floor and into which the second upper rail (21) is slidably inserted.

The above-mentioned first and second slide rails (10)(20) cooperate to form the present seat slide device, and two reclining devices (3)(3') each with a lock mechanism are respectively fixed to the upper rails (11)(21) of the two slide rails (10)(20). And, an anchor (4) of a seat belt is mounted to the second slide rail (20).

The illustrated seat frame (5) is mounted to the first and second upper rails (11)(21) through two lifters (6)(6') which move up and down the forward and backward portions of a seat cushion independent of each other.

Figure 2:
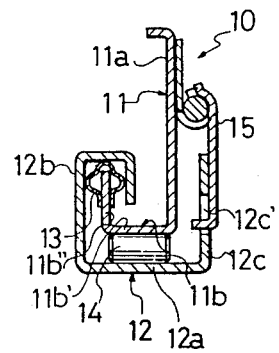
FIG. 2 is a section view taken along the line II—II in FIG. 1.

In FIG. 2, there is illustrated the first slide rail (10) in detail. The first upper rail (11) of the first slide rail (10) comprises a vertically extending mounting portion (11a) for mounting the above-mentioned lifters (6) (6') and reclining device (3), and a first slide portion (11b) of a U-shaped form which is provided at and extended from the lower end of the mounting portion (11a) integrally therewith. The first slide portion (11b) is composed of a horizontal portion (11b') and a stand-up portion (11b")

which is folded upstandingly at the tip end of the horizontal portion (11b') and also to which stand-up portion (11b") is mounted a slider (13) formed of a plate spring.

The first lower rail (12) into which the slide portion (11b) of the first upper rail (11) is slidably inserted comprises a bottom plate (12a), an engagement portion (12b) standing up at and from one edge of the bottom plate (12a) to be engageable with the stand-up portion (11b") of the above-mentioned upper rail (11), and a hitch portion (12c) standing up at right angles at and from the other edge of the bottom plate (12a) for securing a stopper (15) provided on the side of the upper rail (11). The hitch portion (12c) is formed with a large number of hitch holes (12c') in the longitudinal direction thereof. In FIG. 2, reference numeral (14) stands for a roller formed of metal.

Both of the above-mentioned first upper rail (11) and first lower rail (12) are formed of a metal plate having a thickness of the order of 1.6 mm.

Figure 3:
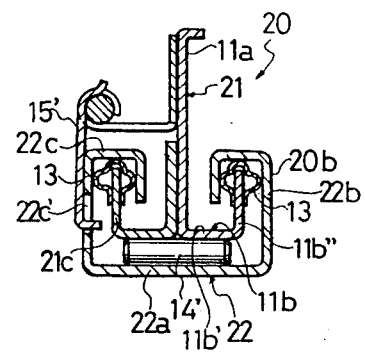
FIG. 3 is a section view taken along the line III—III in FIG. 1.
Figure 4:
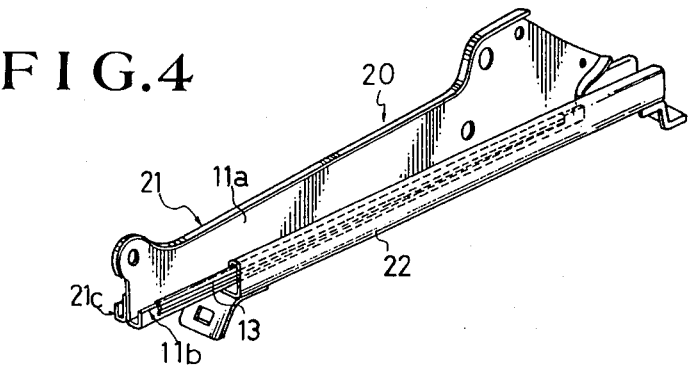
FIG. 4 is a perspective view of a second slide rail employed in the invention; and, FIG. 5 is a perspective view of the slide device according to the invention to which the seat frame and back frame have been attached.

Referring now to FIGS. 3 and 4, there is shown the second slide rail (20). The second upper rail (21) of the second slide rail (20) is formed by use of the above-mentioned first upper rail, that is, it is formed by fixing a second slide portion (21c) to the lower portion of the mounting portion of the upper rail (11) by welding or similar means. The second slide portion (21c) is similar to the first slide portion (11b) in shape, but it is formed of a thicker metal plate (2.6 mm).

The second lower rail of the second slide rail (20), into which the two slide portions (11b)(21c) of the upper rail (21) are slidably inserted, is formed of a metal plate having the same thickness as with the second slide portion (21c), and it comprises a bottom plate (22a) and two engagement portions (22b)(22c) extended upstandingly from the two ends of the bottom plate (22a) to be engageable with the first slide portion (11b) and second slide portion (21c), respectively. One (22c) of the engagement portions is formed with a large number of hitch holes in the longitudinal direction thereof. That is, if a stopper (15') provided in the mounting portion (11a) of the upper rail (21) is engaged into any one of the hitch holes (22c'), then the upper rail (21) can be locked.

Figure 5:
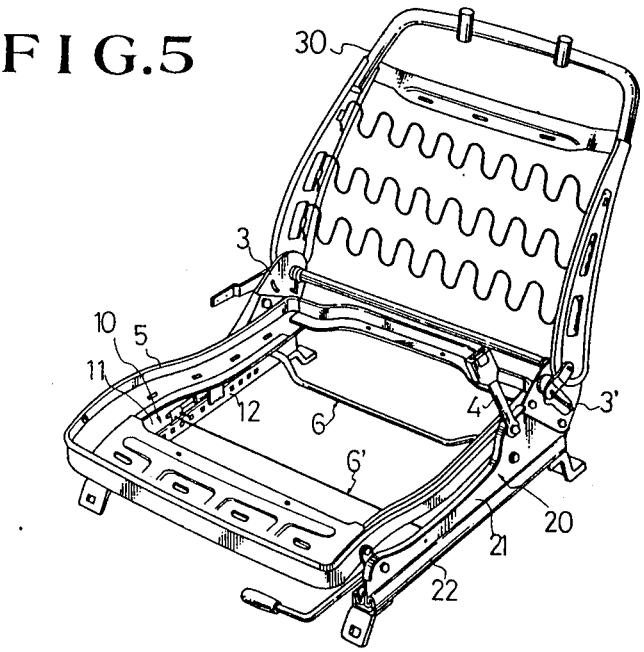

FIG. 5 illustrates a frame of an automotive seat which incorporates the seat slide device according to the present invention.

Thanks to the structure that has been described hereinbefore, the present invention has the following effects when compared with the conventional seat slide devices:

(1) Due to the fact that both of the first and second slide portions of the second upper rail of the second slide rail are in engagement with the second lower rail, even when a great and sudden removing load is applied to the second upper rail by the seat belt anchor, the second slide rail is able to deal with such load with the increase in weight minimized;

(2) The second upper rail of the second slide rail can be formed by use of the first upper rail of the first slide rail, and it can be used in common between a driver's seat and an assistant's seat; and, (3) Both of the second upper and lower rails can be formed greater in height than the conventional rails, with the result that, when the anchor of the seat belt and the reclining devices are fixed, the loads given by them can be dispersed so that the invention is advantageous dynamically over the conventional slide devices.

What is claimed is:

1. A seat slide device consisting of:
   a first slide rail comprising a single upper rail having a first U-shaped slide portion at the lower end of the vertically extending mounting portion, and a first lower rail into which said first slide portion of said first upper rail; and
   a second slide rail of different configuration from said first slide rail comprising a double upper rail having in the lower portion thereof a first slide portion identical with said first slide portion of said single upper rail and a second slide portion disposed on the opposite side of said first slide portion, and a second lower rail into which said first and second slide portions of said second upper rail are inserted, lock mechanisms of reclining devices provided respectively on said first and second slide rails, a seat belt anchor is mounted to the double upper rail of said second slide rail,
   wherein said single upper rail includes a vertically extending mounting portion for mounting lifters and one of said reclining devices and said first U-shaped first slide portion provided at and extended from the lower end of said mounting portion integrally therewith.

2. A seat slide device as claimed in claim 1, wherein said first lower rail, into which said slide portion of said first upper rail is slidably inserted, comprises a bottom plate, an engagement portion standing up from one edge of said bottom plate to be engageable with an upstanding portion of said first upper rail, and a hitch portion standing up at right angles from the other edge of said bottom plate to be able to secure a stopper provided on the side of said first upper rail, said hitch portion being formed with a large number of engagement holes in the longitudinal direction.

3. A seat slide device as claimed in claim 1, wherein said second upper rail is substantially identical with said first upper rail and wherein said second slide portion of said second upper rail is identical in shape with said first slide portion thereof but it is formed of a metal plate thicker than that of said first slide portion, and said second slide portion is fixed thereto by welding or similar means.

4. A seat slide device as claimed in claim 1, wherein said second lower rail is formed of a metal plate equal in thickness to that of said second slide portion of said second upper rail and includes two engagement portions respectively provided upstandingly on the two sides of said bottom plate, into which said first and second slide portions can be inserted respectively.

5. A seat slide device as claimed in claim 1, wherein there is provided a metal roller between said horizontal portion of each of said first and second slide portions and said second lower rail.

* * * * *